INVENTORS
EARL J. BAUER
CHARLES M. LENTS

BY Thomas A. Harwood
ATTORNEY

United States Patent Office 3,403,523
Patented Oct. 1, 1968

3,403,523
PROCESS AND APPARATUS FOR THE PREPARATION AND DISPENSING OF A BEVERAGE
Earl J. Bauer, 6715 Brookshire Drive 75230, and Charles M. Lents, 7026 Atha 75217, both of Dallas, Tex.
Filed Jan. 31, 1967, Ser. No. 613,021
9 Claims. (Cl. 62—70)

ABSTRACT OF THE DISCLOSURE

This invention relates to methods and apparatus for preparing and dispensing frozen, carbonated, soft drink type beverages. More particularly, it relates to such methods and apparatus that are characterized by simplicity and constant quality of the beverage. To accomplish this, the ingredients of the beverage comprising carbon dioxide, water and syrup are premixed to form a foam or froth of finely divided particles to initiate carbonation of the drink, the mixture is frozen in a refrigeration chamber under atmospheric pressure in the presence of a carbon dioxide environment while maintaining a substantial volume of space in the chamber that is occupied by the carbon dioxide, and the beverage is then dispensed in frozen form.

---

There has recently been placed on the market machines for preparing and dispensing frozen, carbonated beverages of the soft drink variety, whereby the beverages are dispensed into an open container and sold over the counter. The beverages comprise a mixture of water, syrup and carbon dioxide that is frozen so that upon melting the drink is not diluted as is the case where a soft drink is cooled with pure ice. The purposes of these machines and their advantages over the older more conventional soft drink dispensing machines are generally known.

It is the object of this invention to provide methods and apparatus for producing a frozen, carbonated soft type drink beverage of the type above referred to. That is to say, it is the object of this invention to provide methods and apparatus for producing a frozen beverage that is carbonated, wherein the frozen particles of the drink themselves are comprised of the necessary constituents to form the drink; namely, water, syrup and carbon dioxide. This eliminates the necessity of cooling the drink in an open container with pure ice so as to avoid the problem of dilution of the drink itself as the ice melts.

Certain disadvantages are attendant to machines presently on the market for preparing and dispensing frozen beverages as relates to the complexity of the apparatus, the quality of the beverage prepared and the method of dispensing the beverage. Those machines in which the beverage is maintained under super-atmospheric pressure in a refrigerated chamber are characterized by several disadvantages in the dispensing of the beverage and in the quality of the beverage itself. A machine of this type relies upon freezing of the beverage as it is dispensed, since upon dispensing of the beverage to atmospheric pressure, the mixture will expand and cool to freezing. The disadvantages of dispensing in this maner are that it is very difficult to dispense the drink in exactly the same mixture ratio as contained in the liquid state within the refrigerated chamber, and that the frozen beverage is blown into the cup or other type container under high pressure, thus leaving air pockets for the beverage to collapse. Those machines which operate under atmospheric pressure are characterized by the disadvantage of the inability to sufficiently carbonate the beverage.

In at least one specific aspect of the invention, it is an object to provide methods and apparatus for producing a carbonated, frozen beverage without operating under super-atmospheric conditions, wherein the beverage is frozen in the chamber and dispensed in the identical frozen state. This insures constant quality of the beverage. It is another specific object to provide methods and apparatus wherein the drink or beverage is sufficiently carbonated even though operating under essentially atmospheric pressure. A further object is to provide such methods and apparatus that are greatly simplified over conventional and existing techniques.

In accordance with the above objects and aspects of the invention, it is contemplated that the beverage, comprising the constituents of water, syrup and carbon dioxide, are frozen to the desired extent within a refrigeration chamber under essentially atmospheric conditions and dispensed in the same form and state as that which exists within the refrigerated chamber. To accomplish these objects, the invention comprises a refrigerated chamber within which the beverage is cooled or frozen, and means for agitating the mixture contained within the chamber to prevent freezing of the mixture to the walls of the chamber and to adequately mix the constituents comprising the mixture. Since the methods and apparatus contemplate the preparation and dispensing of the beverage under atmospheric conditions, a super-atmospheric pressure of carbon dioxide cannot be relied upon to carbonate the beverage. In fact, it is desired to eliminate the necessity of any super-atmospheric chamber to eliminate the necessity of costly equipment and to relieve the problems incurred when dispensing the beverage under such conditions.

In order to carbonate the beverage to the extent desired, means are provided for premixing the carbon dioxide with the other ingredients, namely, water and syrup, and admixing the mixture of carbon dioxide, water and syrup into the refrigeration chamber in this premixed condition. The nature of this premixing process is important and requires the breaking up of the water, syrup and carbon dioxide into finely divided particles and gas bubbles to form a foamy or frothy mixture as it enters the refrigeration chamber.

The mixture as it initially enters the refrigeration chamber is in a liquid and gaseous state and is frozen while being agitated within the chamber. In order to provide the degree of carbonation desired, it is important that the liquid mixture within the container be maintained at or below a predetermined level, thus providing not only a space for expansion of the liquid as it freezes within the chamber, but a space above the liquid and frozen mixture which is occupied by carbon dioxide. Means are provided for agitating the mixture so as to pass it through the carbon dioxide filled space at the top of the tank, thus insuring a carbon dioxide environment for the mixture within the chamber at all times. This does not infer that the carbon dioxide is compressed as the liquid freezes and expands, since the chamber itself is open to the atmosphere. Suitable means are provided for controlling the level of the liquid and the frozen mixture within the chamber so that all of the carbon dioxide is not driven out of the chamber so as to leave an atmosphere void of the carbonating gas. Thus it will be seen that the syrup and water is initially premixed with the carbon dioxide to provide some degree of carbonation and as the temperature of the mixture is lowered within the chamber and the mixture is agitated within an environment of carbon dioxide, sufficient carbonation of the beverage is effected.

The level of both the liquid within the chamber and the frozen mixture is maintained by any suitable means. As beverage is dispensed from the apparatus, the level of the frozen mixture within the chamber will drop and control means actuates suitable supply means for admitting additional premixed ingredients into the chamber in the form of a foam. When the mixture rises to a predetermined level, the control means shuts off the supply, thus leaving the desired space above the level of the mixture.

Since dispensing of the bevarage into the atmosphere is not relied upon for freezing the beverage, the consistency and quality of the dispensed beverage can be exactly determined and controlled within the refrigeration chamber. Nor are gas pockets created upon dispensing. Consequently, the invention is not only directly applicable to but now makes possible the automatic dispensing of such frozen beverages by vending machines, since such an application requires a constant and controllable process to insure the same volume and quality of beverage dispensed each time.

Other objects, features and advantages of the invention will become readily apparent from the following detailed description thereof when taken in conjunction with the appended claims and the attached drawing wherein like reference numerals refer to like parts throughout the several figures, and in which:

Figure 1:
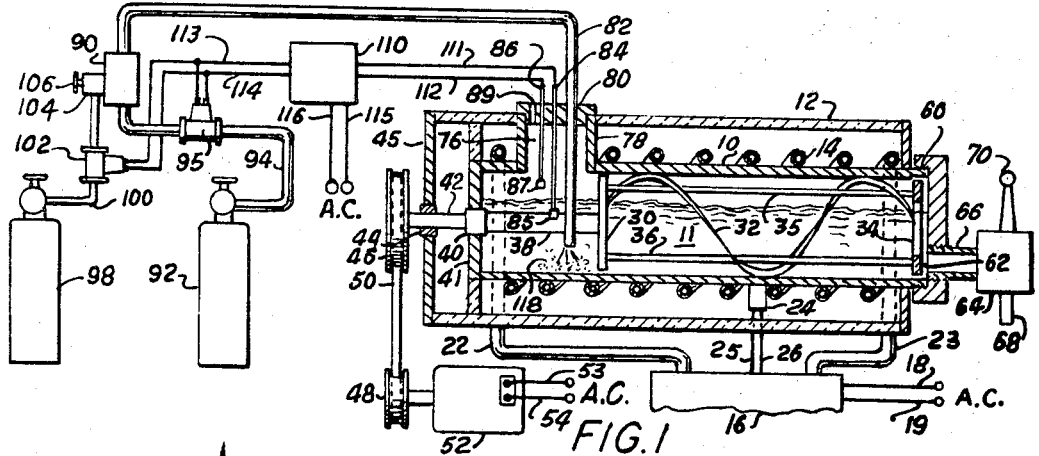
FIGURE 1 is a partly schematic and partly elevational view, partly in section, of one embodiment of the apparatus of the invention.

The embodiments of the apparatus shown in FIGURE 1 comprise a refrigeration chamber 10 within which there is mixed and frozen a beverage 11 that is to be dispensed therefrom. The refrigeration chamber is enclosed within an insulating chamber 12 spaced therefrom with suitable refrigeration coils 14 wound about the refrigeration chamber in contact therewith. Any suitable refrigeration apparatus 16, shown in fragmentary schematic, can be employed which is operated from any suitable AC outlet through conductors 18 and 19. The refrigeration coils are connected to the refrigerating unit by means of conduits 22 and 23. Any suitable thermostat 24 maintaining contact with the refrigeration chamber, or maintained in contact with the mixture on the inside thereof, as the case may be, is employed and is connected to the refrigeration unit through conductors 25 and 26 to regulate the temperature within the refrigeration of the chamber.

Disposed within the refrigeration chamber and running along a part of the length thereof is an agitator means 30 which, in the embodiment shown, comprises a helical blade which is rotated about the axis of the refrigeration chamber in contact with the walls thereof. The helical blade is supported between a circular plate 30 on one end thereof and an annular ring member 34 at the other end thereof adjacent the outlet of the chamber, with the circular plate and annular ring being connected together for additional support by rods 35 and 36. The agitator is further supported and caused to rotate through a shaft 38 attached to the rear of the circular plate 30, which shaft is journaled in a liquid tight coupling 40 extending through the rear wall 31 of the refrigeration chamber. Engaged to the other side of the coupling is another shaft 42 which extends through a bushing 44 through the rear wall 45 of the insulating chamber 12 and is connected at this end to a pulley 46. Another pulley 48 is driven by an electric motor 52 and drives pulley 46 through belt 50, wherein the electric motor is operated from any suitable AC source through conductors 53 and 54.

The refrigeration chamber is open at the front end 34 and is provided with a cap 60 threaded about thereon, which cap is also provided with an opening 62 adjacent the bottom of the chamber. An outlet conduit 66 is threaded into the threaded opening 62 of the cap and communicates with a tap or discharge outlet 64 provided with a lever 70 for discharging the beverage through a spigot 88.

An inlet port 76 is provided at the top of the refrigeration chamber adjacent the rear thereof by means of vertical, cylindrical openings 78 extending through the insulating chamber and communicating with the interior of the refrigeration chamber. A cap 80 is provided to the top of the inlet for supporting liquid level control means and a mixture inlet conduit within the refrigeration chamber, but does not provide an air tight seal. Rather, the refrigeration chamber is maintained at atmospheric pressure, such as through any suitable port 89 provided in the cap.

Extending through the cap 80 and down into the refrigeration chamber adjacent the bottom thereof is a mixture inlet conduit 82 through which a mixture of carbon dioxide, water and syrup is supplied to the interior of the refrigeration chamber. Also extending through cap 80 is a liquid level control electrode 84 having a conducting tip 85 at the bottom thereof. A similar liquid level control electrode 86 extends through the cap and has a conducting tip 87 at the bottom thereof. Tip 85 of the control electrode 84 is disposed at approximately the half full level point within the refrigeration chamber, whereas tip 87 of the control electrode 86 is disposed a substantial distance thereabove, the separation depending upon the type and sensitivity of control desired as explained more fully below.

Conduit 82 is connected to a premix chamber 90 from which the mixture is supplied. Connected to the one input of the premix chamber is a pressurized source 92 of premixed water and syrup by means of a conduit 94 having a solenoid valve 96 connected therein. Connected to another input of the premix chamber 90 is a pressurized source 98 of carbon dioxide by means of another conduit 100 having another solenoid valve 102 connected therein. The carbon dioxide is supplied to the premix chamber through an injection means 104 which comprises an orifice opening controlled by a screw 106.

The liquid level control electrodes 84 and 86 are connected to a liquid level control unit 110 by means of conductors 111 and 112, respectively. The function of the liquid level control unit 110 is to provide an output upon the contacting of the conducting tips of the control electrodes by the mixture within the refrigeration chamber, and this output is used to operate solenoid valves 96 and 102 by connection therewith through conductors 113 and 114, as shown. The liquid level control unit is suitably operated from any AC source through conductors 115 and 116, and can comprise any suitable control unit or liquid level control known in the industry.

To operate the system, it is desirable to initially flush or purge the interior of the refrigeration chamber with carbon dioxide prior to admitting any of the liquid mixture. To do this, the manual valve on the syrup and water mixture tank 92 is closed off and the carbon dioxide is allowed to flow into the chamber through inlet conduit 82. Once this is done, the carbon dioxide will remain within the tank and will not be forced out by air from the outside even though the chamber is at atmospheric pressure, since the carbon dioxide is heavier than air.

After purging with carbon dioxide, the manual valve on the liquid mixture tanks 92 is opened and the liquid level control electrodes cause the actuation of solenoid valve 92 and 102 to admit a premixed foam of the carbon dioxide, water and syrup to the refrigeration chamber. The particulars of the premixing of the ingredients will be further explained below. However, it will be stated that the carbon dioxide, water and syrup are broken up into finely divided particles and bubbles to form a foam or froth. This foam is then admitted to the chamber through conduit 82.

Solenoid valves 96 and 102 can be of the ordinarily closed type which are opened by the application of an electrical signal thereto. Conversely, these valves can be of the ordinarily open type which are maintained closed by a constant electrical signal applied thereto until the electrodes 85 and 87 cause the removal of the output signal from the control unit 110. The liquid level control unit and associated control electrodes can be of any suitable type well known in the art as stated above, where actuation of the control unit to admit mixture to the chamber is effected by the dropping of the liquid level within the chamber below the conducting tip 85 of electrode 84. As the mixture is admitted to the chamber and the level thereof rises above the conducting tip 85, the mixture is not cut off, but continues to flow into the chamber until the level reaches the conducting tip 87 of electrode 86, at which time the control unit operates to close off valves 96 and 102. However, dropping of the level within the chamber below the conducting tip 87 does not cause the actuation of the control unit to open the valves, but only when the level drops below the conducting tip 85. This decreases the sensitivity of the liquid level control means so as to prevent constant and repetitive opening and shutting of valves upon very small fluctuations of the level within the refrigeration chamber. Especially is this important since as the mixture is initially admitted to the chamber, it is in a liquid form and has a rather well defined level, but upon freezing of the mixture and agitation thereof, the level varies rapidly upon agitation and would cause erratic operation of the control unit. As noted earlier, the conducting tip 85 of the control electrode 84 is maintained at approximately the half full level point within the chamber, whereas conducting tip 87 is spaced thereabove by a distance suitable to prevent the erratic and continuous operation of the control unit.

The premixed carbon dioxide, water and syrup emerge from the inlet conduit 82 into the chamber in the form of a foam or froth 118 which is comprised of finely divided particles and bubbles of the liquid and gaseous matter. The breaking up of these constituents greatly aids in the mixing and carbonation of the liquid, especially at atmospheric pressure, and as the liquid and foam are reduced in temperature, a further carbonation of the product is effected. An atmosphere 120 of carbon dioxide prevails in the space above the level of the mixture within the chamber due to the initial purging of the apparatus with the gas and the fact that the foamy mixture contains a substantial amount of gas as it enters the chamber, some of which separates out of the mixture. The carbon dioxide has little tendency to escape from the chamber since it is heavier than air, and as the mixture is agitated by the helical blade 32, it is mixed up into the carbon dioxide atmosphere to capture and freeze a substantial amount therein. In all events, the entire mixture is maintained in an atmosphere of carbon dioxide. Upon opening of the discharge spigot 68, the mixture is urged out into any suitable open top container by the helical blade acting as an auger.

The temperature within the chamber is maintained at or just below the freezing point of the beverage mixture at atmospheric pressure by thermostat 24. However, the average temperature within the chamber can be varied to produce a beverage when dispensed of any desired consistency; namely, completely frozen or varying degrees of frozen and liquid parts.

There are several important features of the invention that should be noted. First, the apparatus is extremely simplified as compared to existing and conventional apparatus for the similar purposes, since no elaborate carbonation means are required and the chambers do not have to be built to operate under super-atmospheric conditions. Secondly, effective carbonation of the beverage to the desired extent is achieved without elaborate carbonation means and without the use of super-atmospheric apparatus. Maintaining of the level within the refrigeration chamber is important in always providing the space at the top of the chamber which provides the carbon dioxide environment. A very important feature is the fact that the beverage is frozen within the chamber and is discharged therefrom in exactly the same state as that which exists within the chamber, and is not discharged under pressure. Thus the quality control and the control of the consistency of the beverage produced is much better and can be controlled more accurately. Moreover, opening of the outlet valve does not cause large quantities of carbon dioxide to escape, which could reduce the carbon dioxide atmosphere and cause the discharged beverage to be filled with gas pockets. The premixing of the carbon dioxide, water and syrup in the proper manner is also very important in that the resultant frozen beverage should have a very fine texture of finely divided frozen particles. The premixing of these ingredients in a foamy state provides for the initial freezing of the mixture in the proper state and greatly aids in the carbonation of the beverage.

The superior quality and consistency control of the beverage produced can be more readily seen when compared to beverages produced by apparatus operating under super-atmospheric pressure. In the latter case, it is virtually impossible to maintain the same pressure within the refrigeration chamber due to repetitive dispensing of the beverage and supplying additional mixture thereto. Thus widely different ratios of beverage and gas are discharged from the machine. As to the other apparatus operating under atmospheric pressure, the beverage is not effectively carbonated.

The mixture supplied to the refrigeration chamber of the apparatus shown in FIGURE 1 is what is referred to as premix, or where the syrup and water have been premixed. It will be apparent that a post mix system can be employed with equal effect, whereby one or more pumps are used to draw syrup and water into a premix chamber from suitable reservoirs, and to pump the mixture into the refrigeration chamber. The syrup and water in such a system can be mixed prior to the addition of the carbon dioxide or all can take place in the same premix chamber.

The apparatus can be varied in other aspects as well. For example, the particular agitator means is shown as an example only, whereas any suitable means to accomplish the same purpose can be employed. Other variations will undoubtedly occur which will provide suitable results.

Figure 2:
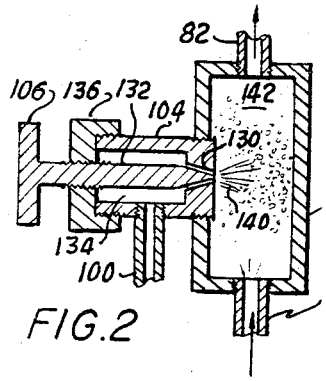
FIGURE 2 is a fragmentary, elevational view, in section, of a premixing chamber and means for creating a foamy or frothy state between the water, syrup and carbon dioxide as it enters the refrigeration chamber.

One embodiment of a premix foaming chamber such as shown in FIGURE 1, is shown in more detail in the fragmentary, elevational view, in section, of FIGURE 2. Connected to opposite ends of chamber 90 are the intake conduit 94 from the premix container 92 of syrup and water and the inlet conduit 82 leading into the refrigeration chamber. A fitting 104 that defines a small chamber 134 therewithin is secured to the side of the chamber 90 and communicates with the interior thereof as another inlet, wherein the fitting defines an orifice 130 providing communication between the interior of chamber 90 and the interior of the fitting. An air tight cap 136 is secured to the fitting to seal it off through which a needle member 132 extends and is threadedly engaged therewith. The needle forms a valve with the orifice 130 in which the opening of the valve is selectively variable by rotating the needlehead 106. The intake conduit 100 from the carbon dioxide tank is threaded to communicate with the interior 134 of the fitting 104, so that carbon dioxide is supplied to the fitting through conduit 100 and is injected into the premix chamber 90. As the syrup and water pass through chamber 90, the jet 140 of carbon dioxide is mixed with the other ingredients to form a foam or froth 142 comprising finely divided particles and bubbles of the liquid and gas. Regulation of the orifice opening determines the amount of carbon dioxide that is injected into the liquid stream. The foam or froth is then delivered to the interior of the refrigeration chamber through conduit 82.

Figure 3:
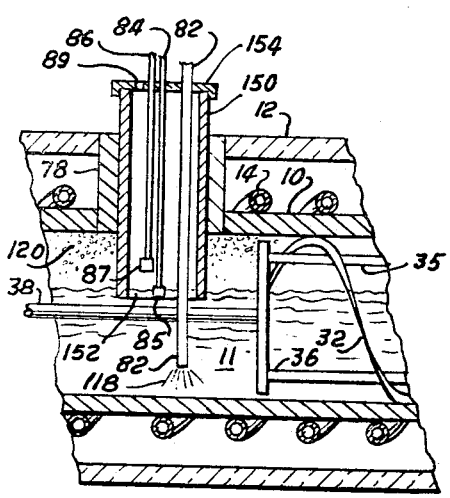
FIGURE 3 is a fragmentary, side elevational view, partly in section, of another embodiment of the apparatus of the invention that employs baffle means for maintaining a carbon dioxide atmosphere above the mixture within the refrigeration chamber.

Another embodiment of the apparatus very similar to that described in FIGURE 1, but which uses a baffle to aid in the carbonation of the product, shown in the fragmentary, elevational view, partly in section of FIGURE 3. In this particular embodiment, a cylindrical housing 150 having a hollow interior 156 is disposed in the opening extending into the refrigeration chamber through the insulating chamber, and has an open end at a bottom thereof and is closed on the top by cap 154. Again, it will be emphasized that the cap 154 does not provide an air tight seal, but allows the chamber to remain open to the atmosphere. The inlet conduit 82, and the two control electrodes 84 and 86, are supported through the cap and extend down into the chamber. The open end 152 of the cylindrical housing extends just below the average half full level of the mixture contained within the refrigerated chamber so as to constitute a baffle between the carbon dioxide filled space above the mixture and the outside of the refrigeration chamber. Thus the carbon dioxide does not exit directly to the outside atmosphere through the opening in the chamber, but it will be recognized that should the mixture within the container expand sufficiently, the carbon dioxide will penetrate the mixture and tend to exit from the chamber, if necessary, through housing 150, thus preventing any substantial pressure build up. For all practical purposes, then, the embodiment shown in FIGURE 3 operates under atmospheric conditions the same as the apparatus shown in FIGURE 1.

The baffle effect created by housing 150 serves another important function besides more effectively maintaining a carbon dioxide atmosphere. The probe 85 which actuates the system to admit more mixture to the chamber as the level drops away therefrom is positioned at about the open end of the baffle, so as to add to the mixture should the level fall below this open end. As mixture is added in the form of a foam, most of it becomes liquified just before it freezes. As the mixture level increases above the bottom of the baffle, the carbon dioxide in the top of the chamber prevents a substantial mixture level increase so as to cause the newly added liquid to rise in the housing 150. Once the liquid level rises to probe 87, the supply is shut off. All of this occurs very rapidly, and further agitation causes the liquid level to drop and the liquid to be frozen with the rest of the mixture. It will be seen then that the constant agitating of the mixture does not cause erratic fluctuations of the control system admitting the mixture. Moreover, probe 87 can be positioned at any height within the housing 150 so as to allow a substantial supply of mixture to be added without causing the chamber to be over filled while still maintaining the necessary decreased sensitivity to the mixture level.

Figure 4:
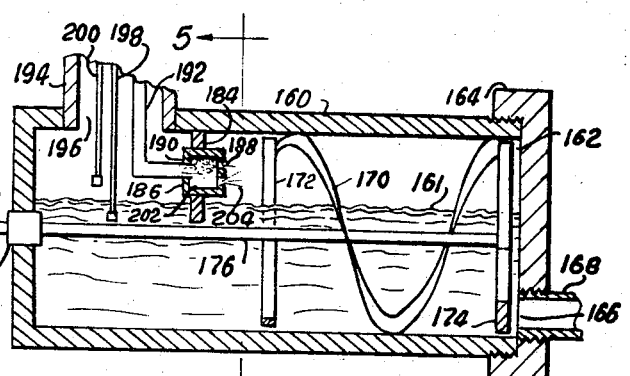
FIGURE 4 is a fragmentary, side elevational view, partly in section, of another embodiment of the apparatus of the invention using a different type of baffle.

Another embodiment of the apparatus of the invention that employs a different foaming type unit is shown in the fragmentary, elevational view, partly in section, of FIGURE 4. Only those parts of the system that are necessary to the understanding of the foaming unit as it cooperates with the refrigeration chamber are shown. The refrigeration chamber 160 again has an open end 162 to which a cap 164 is secured, the latter of which defines an opening 166 at the bottom thereof. An outlet conduit 168 is secured through the opening 166 for the discharge of the frozen mixture. As previously noted, an agitator 170 is employed which engages the interior walls of the refrigeration chamber and is supported by annular rings 172 and 174 on the opposite ends thereof. The agitator blade and rings are supported on a shaft 176 which is journaled through a bearing 178 and connected to a drive shaft 180.

Figure 5:
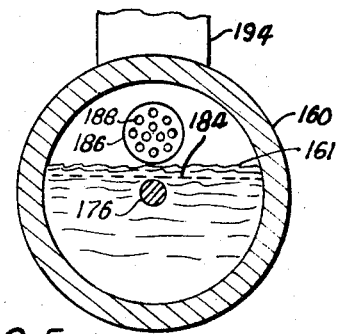
FIGURE 5 is an elevational view, in section, taken through section lines 5—5 of FIGURE 4.

Referring also to the end elevational view, in section, of FIGURE 5 taken through section lines 5—5 of FIGURE 4, a baffle 184 forming a chord of a circle in elevational profile is supported from the top interior of the refrigeration chamber and extends to substantially the half level point within the chamber. Extending through the baffle and secured thereto is a spray head or device 186 defining a hollow interior 190 therewithin and holes and orifices 188 opening from the interior of the spray device into the interior of the refrigeration chamber 160. Communicating with the spray device is the intake conduit 192 through which carbon dioxide, syrup and water are supplied. The intake conduit 192 and level control probes 198 and 200 are supported by any suitable means and extend through the inlet opening 196 provided to the refrigeration chamber by means of cylindrical housing 194. As the carbon dioxide, water and syrup are admitted to the spray device through conduit 192, they are agitated together within the interior 190 and injected into the open space within the refrigeration chamber above the level of the mixture. These ingredients are agitated within the spray device to form a foam 202 which is injected into the chamber in the form of a spray 204. This provides the same function as provided by the premix chamber and orifice injecting device shown in FIGURE 2. In order to further break up the particles and bubbles of the liquid and carbon dioxide, the premix chamber device shown in FIGURE 2 can be used in conjunction with the spray device shown in FIGURE 4, wherein the ingredients initially pass through the previously described device and then through the spray head shown in the embodiment of FIGURE 4.

The baffle 184 provides essentially the same function as baffle 150 shown in FIGURE 3, so that maximum carbonation is effected under atmospheric conditions. In addition, the baffle acts in the same capacity as that previously described insofar as shielding the agitated section of the chamber from the level control probes. Thus the level behind the baffle can rise higher than the level in front upon adding additional mixture to the chamber, this height depending upon the height of the probe 200.

The invention has been described with reference to particular embodiments thereof. However, certain modifications and substitutions that do not depart from the true scope and spirit of the invention and which are not specifically called out above can undoubtedly be made. Accordingly, it is intended that the invention be limited only as defined in the appended claims.

What is claimed is:

1. Apparatus for producing and dispensing a carbonated frozen beverage drink from a mixture of syrup, water, and carbon dioxide, comprising:
   (a) a chamber within which said drink is frozen having an outlet for dispensing said drink,
   (b) said chamber having an inlet through which said mixture is supplied and through which said mixture contained within said chamber is maintained at substantially atmospheric pressure,
   (c) means for agitating said mixture within said chamber,
   (d) supply means for supplying said mixture to said chamber through said inlet in a premixed state,
   (e) means for chilling the mixture within the chamber to lower the temperature of the mixture being dispensed to at least its freezing point, and
   (f) control means for controlling said supply means to maintain said mixture in said chamber at a volume which is substantially less than the volume of said chamber, and
   (g) baffle means for maintaining an atmosphere having a substantial concentration of carbon dioxide at substantially atmospheric pressure in said chamber above said mixture.

2. Apparatus as set forth in claim 1 wherein said baffle means is disposed within said chamber and extends below the level of said mixture contained in said chamber.

3. Apparatus as set forth in claim 1 wherein said supply means for supplying said mixture to said chamber comprises first conduit means for supplying said syrup and water to said chamber through said inlet, and second conduit means connected to said first conduit means for introducing said carbon dioxide into said syrup and water under pressure to foam said mixture.

4. Apparatus as set forth in claim 1 wherein said baffle means comprises sleeve constituting an extension of said inlet projecting below the level of said mixture that forms a seal above said level of said mixture between said inlet and the volume within said chamber not occupied by said mixture.

5. Apparatus as set forth in claim 4 wherein said control means comprises level detection means disposed within said sleeve for actuating said supply means when said mixture is decreased within said chamber to a first level and for deactuating said supply means when said mixture is increased within said chamber to a second level inside said sleeve greater than said first level.

6. Apparatus for producing and dispensing a carbonated frozen beverage drink from a mixture of syrup, water, and carbon dioxide, comprising:
   (a) a chamber within which said drink is frozen having an outlet for dispensing said drink,
   (b) said chamber having an inlet through which said mixture is supplied and through which said mixture contained within said chamber is maintained at substantially atmospheric pressure,
   (c) means for agitating said mixture within said chamber,
   (d) means for refrigerating said chamber to freeze said mixture therewithin,
   (e) means for supplying said mixture to said chamber through said inlet at a premixed state,
   (f) control means for controlling said means for supplying said mixture to said chamber to maintain said mixture in said chamber at a volume substantially less than the volume of said chamber,
   (g) said means for supplying said mixture to said chamber comprising conduit means extending into said chamber through said inlet through which said mixture is supplied, and sprayer means forming the termination of said conduit means in said chamber through which said chamber is sprayed out into said chamber to foam said mixture.

7. Apparatus as set forth in claim 6 including baffle means disposed within said chamber extending below the level of said mixture contained within said chamber that forms a seal above said level of said mixture between said inlet and the volume of said chamber into which said mixture is sprayed.

8. A process for preparing and dispensing a carbonated frozen beverage that comprises a mixture of syrup, water, and carbon dioxide, comprising the steps of:
   (a) mixing said carbon dioxide with said syrup and water to form a premixed state of said mixture,
   (b) introducing said premixed mixture into a closed container vented to atmospheric pressure,
   (c) freezing said premixed mixture within a closed container while agitating and maintaining said mixture at substantially atmospheric pressure,
   (d) maintaining the volume of said mixture within said container less than the volume of said container,
   (e) maintaining the volume within said container not occupied by said mixture substantially filled with carbon dioxide and
   (f) thereafter dispensing said frozen mixture from said container.

9. A process as defined in claim 8 further including the step of flushing the container with carbon dioxide to fill the container with carbon dioxide prior to introducing said mixture into the container.

References Cited

UNITED STATES PATENTS

| | | | |
|---|---|---|---|
| 2,132,364 | 10/1938 | Thompson | 62—69 |
| 2,531,315 | 11/1950 | Wyllie | 62—306 X |
| 2,651,186 | 9/1953 | Murphy | 62—69 |
| 3,004,398 | 10/1961 | Mullins | 62—342 X |
| 3,209,554 | 10/1965 | MacManus | 62—306 |
| 3,222,035 | 12/1965 | Lutz et al. | 259—25 |
| 3,044,878 | 7/1962 | Knedlik | 62—306 X |

ROBERT A. O'LEARY, *Primary Examiner.*

W. E. WAYNER, *Assistant Examiner.*